United States Patent
Hoffmann et al.

(10) Patent No.: US 12,331,713 B2
(45) Date of Patent: Jun. 17, 2025

(54) WIND TURBINE COMPONENT FOR A WIND TURBINE TOWER, WIND TURBINE TOWER, ROTOR BLADE, WIND TURBINE AND METHOD FOR PRODUCING A WIND TURBINE COMPONENT

(71) Applicant: Wobben Properties GmbH, Aurich (DE)

(72) Inventors: Alexander Hoffmann, Emden (DE); Albrecht Brenner, Aurich (DE)

(73) Assignee: Wobben Properties GmbH, Aurich (DE)

( * ) Notice: Subject to any disclaimer, the term of this patent is extended or adjusted under 35 U.S.C. 154(b) by 26 days.

(21) Appl. No.: 17/431,662

(22) PCT Filed: Feb. 10, 2020

(86) PCT No.: PCT/EP2020/053356
§ 371 (c)(1),
(2) Date: Aug. 17, 2021

(87) PCT Pub. No.: WO2020/169393
PCT Pub. Date: Aug. 27, 2020

(65) Prior Publication Data
US 2022/0145849 A1    May 12, 2022

(30) Foreign Application Priority Data
Feb. 18, 2019   (DE) .................... 10 2019 103 984.3

(51) Int. Cl.
*F03D 13/20*         (2016.01)
*E04H 12/08*         (2006.01)
(Continued)

(52) U.S. Cl.
CPC .......... *F03D 1/0675* (2013.01); *E04H 12/08* (2013.01); *F03D 13/20* (2016.05); *B29D 23/001* (2013.01);
(Continued)

(58) Field of Classification Search
CPC ....... F03D 1/0675; F03D 13/20; E04H 12/08; E04H 12/02; B29D 23/001; B29D 24/00;
(Continued)

(56) References Cited

U.S. PATENT DOCUMENTS 9,200,468 B2    12/2015  Brenner et al.
9,657,494 B2     5/2017  Kollegger et al.
(Continued)

FOREIGN PATENT DOCUMENTS

CN    104234491 A    12/2014
CN    106837705 A     6/2017
(Continued)

*Primary Examiner* — Aaron R Eastman
(74) *Attorney, Agent, or Firm* — Seed IP Law Group LLP

(57) ABSTRACT

Provided is a wind turbine component for a wind turbine, in particular for a wind turbine tower and/or a rotor blade, to a wind turbine tower, to a rotor blade, to a wind turbine and to a method for producing a wind turbine component. Provided is a wind turbine component for a wind turbine, in particular for a wind turbine tower and/or a rotor blade, comprising a first wall element with a first inner surface and a first outer surface arranged opposite the latter, a corrugated structural element, wherein the structural element is arranged on the first inner surface or on the first outer surface, wherein the first wall element is connected to the structural element.

17 Claims, 8 Drawing Sheets

(51) Int. Cl.
  *F03D 1/06* (2006.01)
  *B29D 23/00* (2006.01)
(52) U.S. Cl.
  CPC ..... *F05B 2230/60* (2013.01); *F05B 2240/912* (2013.01); *F05B 2250/61* (2013.01)
(58) Field of Classification Search
  CPC ............ F05B 2230/60; F05B 2240/912; F05B 2250/61; F05B 2250/60; Y02E 10/72; Y02E 10/728; Y02P 70/50
  See application file for complete search history.

(56) References Cited

U.S. PATENT DOCUMENTS

| | | | | |
|---|---|---|---|---|
| 11,639,708 | B2* | 5/2023 | Schmid | F03D 1/0658 |
| | | | | 416/211 |
| 11,639,709 | B2* | 5/2023 | Borchers | F03D 1/0675 |
| | | | | 416/226 |
| 2012/0047830 | A1* | 3/2012 | Phuly | E02D 27/425 |
| | | | | 52/294 |
| 2013/0064675 | A1 | 3/2013 | Jaquemotte | |
| 2015/0225918 | A1* | 8/2015 | Phuly | E04G 21/02 |
| | | | | 52/297 |
| 2017/0183840 | A1* | 6/2017 | Tozer | E02D 27/425 |
| 2018/0252200 | A1* | 9/2018 | Murugappan | F03D 1/0658 |

FOREIGN PATENT DOCUMENTS

| | | | |
|---|---|---|---|
| CN | 207178119 | U | 4/2018 |
| CN | 108397355 | A * | 8/2018 |
| DE | 102011077428 | A1 | 12/2012 |
| EP | 1624137 | A1 | 2/2006 |
| EP | 2728171 | A2 | 5/2014 |
| GB | 2479875 | A | 11/2011 |
| KR | 20150002182 | A | 1/2015 |
| WO | 2011/110605 | A2 | 9/2011 |
| WO | 2013/091647 | A1 | 6/2013 |
| WO | 2014/067884 | A1 | 5/2014 |

* cited by examiner

WIND TURBINE COMPONENT FOR A WIND TURBINE TOWER, WIND TURBINE TOWER, ROTOR BLADE, WIND TURBINE AND METHOD FOR PRODUCING A WIND TURBINE COMPONENT

BACKGROUND

Technical Field

The invention relates to a wind turbine component for a wind turbine, in particular for a wind turbine tower and/or a rotor blade, to a wind turbine tower, to a rotor blade, to a wind turbine and to a method for producing a wind turbine component.

Description of the Related Art

Wind turbines are known. Modern wind turbines generally concern so-called horizontal-axis wind turbines, in the case of which the rotor axis is arranged substantially horizontally and the rotor blades cover a substantially vertical rotor area. Aside from a rotor arranged at a nacelle, wind turbines generally comprise a tower on which the nacelle with the rotor is arranged so as to be rotatable about a substantially vertically oriented axis.

Towers are generally slim structures which preferably have a large height and which furthermore preferably have relatively small dimensions orthogonally with respect to this height, that is to say are of slim configuration. Towers are preferably composed substantially of concrete and/or steel or comprise these materials. The range of tower designs extends from lattice construction via steel tubular towers with or without cable bracing to concrete structures.

Towers of wind turbines, in particular of modern horizontal-axis wind turbines, account for a major part of the total costs of producing a wind turbine. In particular, the increasing rotor diameters and power outputs of wind turbines mean that the towers are also becoming larger and/or are being subjected to higher loads. Towers are becoming larger firstly in terms of their height and secondly in terms of their diameter, which in many modern wind turbines is already 8 meters or greater, in particular in lower tower sections. In particular, the manufacture and/or the assembly and/or the logistics of the towers is or are time-consuming and expensive. For the transport of towers with large heights and diameters, said towers are provided divided in the longitudinal direction and orthogonally with respect to the longitudinal direction so that they can be transported under bridges, for example. Furthermore, it is generally not possible to transport components weighing more than 80 tons. The individual transversely and/or longitudinally divided towers are generally reassembled at the erection site of a wind turbine.

In the prior art, there are various approaches for reducing the costs and increasing the efficiency during the manufacture and/or assembly of wind turbine towers. For example, DE 10 2011 077 428 A1 describes a wind turbine tower with a plurality of tower segments, the tower segments abutting against one another at horizontal and vertical flanges and being fastened to one another here.

The German Patent and Trademark Office has searched the following prior art in the priority application relating to the present application: DE 10 2011 077 428 A1, EP 1 624 137 A1, WO 2014/067 884 A1.

The existing systems and methods for building and manufacturing wind turbine towers offer various advantages, but further improvements are desirable.

BRIEF SUMMARY

Provided is a wind turbine component for a wind turbine, in particular for a wind turbine tower and/or a rotor blade, a wind turbine tower, a rotor blade, a wind turbine and a method for producing a wind turbine component which alleviate or eliminate one or more of the stated disadvantages. In particular, provided is one or more techniques, which reduces the costs of a wind turbine, in particular the costs for the manufacture and/or the assembly and/or the logistics of a wind turbine tower and/or of a rotor blade. In addition, provided is one or more techniques, which makes it possible to improve the transportability of wind turbine towers, or wind turbine tower sections, and/or of rotor blades.

Provided is a wind turbine component for a wind turbine, in particular for a wind turbine tower and/or a rotor blade, comprising a first wall element with a first inner surface and a first outer surface arranged opposite the latter, a corrugated structural element, wherein the structural element is arranged on the first inner surface or on the first outer surface, wherein the first wall element is connected to the structural element.

The first wall element is preferably configured in the form of a ring segment or in the form of a part-ring segment. This preferably has an axis of rotation which is oriented parallel to a length of the first wall element.

The first wall element may also form a ring section. For example, the first wall element may have two ring sections which, arranged next to one another, form a circular ring. Ring-shaped can also mean polygonal. The axis of rotation of the first wall element is also to be determined for first wall elements with part-ring geometry.

The structural element can also be understood as a spacer element. The structural element is also of corrugated configuration. Corrugated means in particular that the structural element has corrugations and/or trapezoids. The structural element may have corrugations over its entire surface. Alternatively, the structural element may preferably have corrugations in certain sections. The corrugations of the structural element may, for example, have a sinusoidal profile. The corrugations may also have a serrated profile or trapezoids. Trapezoidal corrugations have the advantage that they provide flat contact regions with which the structural element can be arranged on the first wall element. The structural element may be configured in the form of a corrugated sheet or comprise a corrugated sheet. The corrugations of the structural element preferably extend from a first edge of the structural element toward a second edge of the structural element.

A corrugated or thicker body has a higher stiffness than a planar body. A corrugated structural element arranged on a first wall element of a wind turbine component for a wind turbine tower or for a rotor blade leads to a higher buckling stiffness and/or a higher flexural stiffness. As a result of the increased buckling stiffness and/or flexural stiffness, the wind turbine component, and consequently also the wind turbine tower as such or the rotor blade as such, can be configured with a slimmer overall diameter.

This slimmer configuration allows material to be saved, since the strength and stability can be better coordinated. In addition, the manufacture of the wind turbine component is simplified, since the moving during manufacture requires less effort due to the low weight of the wind turbine component. In addition, smaller machines are required to machine the wind turbine component. Furthermore, the logistics are simplified. In particular, wind turbine components can be provided with smaller dimensions, such that their transport on the road is simplified. For example, only those wind turbine components that do not exceed 4.3 meters are regularly provided. This is due to the fact that bridges in Germany, for example, often have a passage restriction for vehicles with more than 4.3 meters. In addition, the proportion of segmented wind turbine components can be reduced and the assembly effort is further reduced.

In a preferred embodiment variant of the wind turbine components, it is provided that the first wall element is of shell-shaped and/or rotationally symmetrical configuration. The first wall element may also be of oval and/or polygonal configuration.

A shell-shaped first wall element is to be understood in particular as an element that is curved at least in certain sections. A rotationally symmetrical first wall element has in particular a cross section that is circular and/or polygonal. In addition, the first wall element may be of oval configuration, an oval configuration in particular making it possible to take prevailing wind directions into account during the dimensioning of a wind turbine tower.

According to a further preferred embodiment variant of the wind turbine component, it is provided that the structural element is of shell-shaped and/or rotationally symmetrical configuration, and is preferably of substantially cylindrical and/or conical configuration.

This means in particular that the macro-geometry of the structural element is of shell-shaped and/or rotationally symmetrical and/or cylindrical configuration. However, the structural element has the corrugated structure within this shell-shaped and/or rotationally symmetrical and/or cylindrical geometry. A structural element configured in this way can in particular assume the macro-geometry of the first wall element.

The structural element may also be composed of or comprise two or more structural element sections. For example, the structural element may have a plurality of structural element sections arranged adjacent to one another in the direction of an axis of rotation of the wind turbine component. In addition, the structural element may have a plurality of horizontally adjacent structural element sections.

A further preferred development of the wind turbine component is characterized in that the first wall element is connected to the structural element by means of an adhesive material, and/or the connection between the first wall element and the structural element is formed without welded joints.

The connection of the first wall element to the structural element by means of an adhesive material has the advantage that the connection partners are essentially not influenced in terms of connection technology. This means in particular that the material of the first wall element and of the structural element is essentially not influenced by the contact with the adhesive material. In particular in comparison to the connection by welding, there is thus no or only little local heating and thus hardening, which often leads to embrittlement of the material.

In a preferred embodiment variant of the wind turbine component, it is further provided that the first wall element extends with a wall element length between a first abutment side and a second abutment side and the structural element extends with a structural element length between the first abutment side and the second abutment side, and the structural element length corresponds substantially to the wall element length.

In this embodiment variant, the structural element is in particular of one-piece configuration in the direction of the wall element length. The wall element length may be 6 meters or 12 meters, for example. The wall element length is preferably greater than 4 meters, or greater than 5 meters, or greater than 6 meters. However, this does not rule out that said structural element has a plurality of structural element sections transversely with respect to the direction of the wall element length. The structural element length preferably corresponds to more than 50%, more than 60%, more than 70%, more than 80% or more than 90% of the wall element length. The wall element length may be oriented for example parallel to the longitudinal direction of a tower section or of a rotor blade, wherein the longitudinal direction may be parallel to an axis of rotation of the wind turbine component.

A further preferred development of the wind turbine component is characterized in that the structural element has a plurality of corrugations, wherein at least one corrugation comprises a connecting section, and the structural element is connected to the first wall element by means of the connecting section.

The connecting section preferably extends in a main direction of extent and in a connection width. The main direction of extent is preferably parallel to the wall element length, and the width of the connecting section is transverse to this. The connection width is preferably between 1 mm and 200 mm, preference being given in particular to between 3 mm and 100 mm.

The structural element preferably has a structural element cross section orthogonally with respect to the main direction of extent of the connecting section. The structural element cross section preferably has a corrugated profile. The corrugated profile can preferably be described with a corrugation length and an amplitude. The amplitude is measured perpendicularly with respect to the corrugation length. The distance between two oppositely arranged connecting sections is also described as the peak-to-valley value and corresponds to twice the amplitude. It follows that the amplitude is oriented perpendicularly with respect to the corrugation length. The corrugation length and the amplitude are preferably oriented perpendicularly with respect to the main direction of extent of the connecting section. The structural element may have corrugations of the same or different amplitude in the vertical direction. In addition, the corrugation length may be the same or different. The stiffness-improving effect of the structural element can particularly advantageously be used if the connecting sections are oriented substantially parallel to the wall element length. The connecting sections may alternatively also be oriented at an angle with respect to the wall element length, for example at a 45° angle.

Furthermore, it is preferably provided that the adhesive material is selected from the group consisting of hot-melt adhesive, polyurethane adhesive, epoxy resin adhesive, and cyanoacrylate. The hot-melt adhesive may be based on polyurethane with a curing temperature of greater than 140° C.

In particular, it is preferred that the adhesive material has a curing temperature of below 250° C., preferably below 90° C., in particular between 75° C. and 85° C. In the case of selected adhesive materials, the curing can also take place at room temperature.

In a preferred embodiment variant of the wind turbine component, it is also provided that the first wall element has a wall thickness and the structural element has a structural element thickness, and the ratio of structural element thickness to wall thickness is greater than 0.1, preferably greater than 0.25, and further preferably greater than 0.5.

A thickness is understood here to mean, in particular, a material thickness. In the case of a first wall element with a circular cross section, the wall thickness corresponds in each case to the radial thickness of the material of the first wall element. However, for the structural element, this definition is generally valid only for the connecting sections. Due to the corrugated geometry of the structural element, it has different lengths in the radial direction. The structural element thickness is to be understood in particular as that thickness of the structural element which is oriented orthogonally with respect to the profile of the corrugation.

A further preferred embodiment of the wind turbine component is characterized in that the structural element is composed of steel, aluminum and/or titanium or comprises steel, aluminum and/or titanium, and/or the structural element is composed of or comprises plastics material, wherein preferably the plastics material is a fiber-reinforced plastic, further preferably is a short-fiber-reinforced plastic and/or further preferably is a glass-fiber-reinforced plastic. In addition, the first wall element may be composed of steel, aluminum and/or titanium or comprise steel, aluminum and/or titanium.

A structural element produced from steel is characterized in particular by its inexpensive production. In addition, a structural element composed of or comprising steel is elastic and has a long service life.

A structural element comprising plastics material or a structural element produced from plastics material is characterized by its low weight and good adhesive properties. In particular, fiber-reinforced plastics can be adapted to the specific load situations of a wind turbine component installed in a wind turbine tower or in a rotor blade. The loads on a wind turbine component can usually be calculated so that the anisotropic properties of fiber-reinforced plastics can be utilized.

Steel for the first wall element is characterized by inexpensive production and good properties for the construction of wind turbine towers. In particular, the good elasticity along with simultaneous stiffness is advantageous for wind turbine components.

In addition, it is preferred that a first flange is arranged on the first abutment side and a second flange is arranged on the second abutment side, the corrugated structural element forms a multiplicity of cavities adjoining the first abutment side and/or the second abutment side, and at least one of the cavities at least partially comprises a filling material, in particular steel and/or plastics material, for example fiber-reinforced plastic, wherein the filling material is configured such that a threaded rod for connection of two wind turbine components can be screwed in, and/or a threaded sleeve is arranged in at least one of the cavities, wherein the threaded sleeve is preferably glued in, and the threaded sleeve is configured such that a threaded rod for connection of two wind turbine components can be screwed in.

The structural element preferably has a recess between two connecting sections which are spaced apart from one another in the direction of the corrugation length. With a corresponding arrangement of the structural element on the first wall element, this recess forms a cavity.

According to a further preferred development of the wind turbine component, it is provided that the corrugations of the structural element have a spacing between adjacent connecting sections of less than 500 mm, less than 400 mm, less than 300 mm, less than 250 mm, less than 210 mm, less than 200 mm, less than 150 mm and/or less than 100 mm, and/or the structural element has more than 20, more than 30, more than 40, more than 50, more than 60, more than 65 and/or more than 70 corrugations, and/or the corrugations of the structural element have an amplitude of more than 10 mm, more than 20 mm, more than 30 mm, more than 40 mm and/or more than 50 mm.

In addition, it may be preferred that the corrugations have a radius in the region of their connecting sections, wherein the radius is greater than 0 mm, greater than or equal to 5 mm, greater than or equal to 10 mm, greater than or equal to 20 mm, greater than or equal to 30 mm, greater than or equal to 40 mm, greater than or equal to 50 mm and/or greater than or equal to 60 mm.

Furthermore, the structural element preferably has a sinusoidal profile orthogonally with respect to the main direction of extent of the connecting sections. In addition, the structural element may have a trapezoidal profile orthogonally with respect to the main direction of extent of the connecting sections.

According to a further preferred embodiment variant of the wind turbine component, it is provided that said wind turbine component comprises a second wall element with a second inner surface and a second outer surface arranged opposite the latter, wherein the structural element is arranged between the first wall element and the second wall element, and the structural element is connected to the first wall element and the second wall element.

The second wall element may have the same features as the first wall element described above. The second wall element is preferably configured in the form of a ring segment or in the form of a part-ring segment and also preferably has an axis of rotation. The second wall element may be of shell-shaped and/or rotationally symmetrical configuration. Furthermore, the second wall element is preferably of oval and/or polygonal configuration.

The second wall element preferably has the same geometry as the first wall element, wherein the second wall element preferably has a smaller diameter such that the second wall element can be arranged in a cavity formed by the first wall element. Such an arrangement has the effect that the first inner surface of the first wall element faces toward the second outer surface of the second wall element. Parallel to its axis of rotation, the first wall element preferably has a wall element length which corresponds substantially to the wall element length, which is oriented parallel to the axis of rotation of the second wall element, of the second wall element.

Furthermore, it is preferred that the structural element has a first corrugation with a first connecting section facing toward the first wall element, and the structural element has a second corrugation with a second connecting section facing toward the second wall element, and the first wall element is connected to the structural element by means of the first connecting section and the second wall element is connected to the structural element by means of the second connecting section.

In a further preferred development of the wind turbine component, it is provided that the first wall element extends with a wall element length between a first abutment side and a second abutment side and the structural element extends with a structural element length between the first abutment side and the second abutment side, and the structural element length corresponds substantially to the wall element length.

In addition, it may be provided that the structural element is arranged in such a way that the connecting sections have their main direction of extent oriented substantially parallel to the wall element length.

It is particularly preferred that the wind turbine component is configured in the form of a tower section or in the form of a rotor blade.

According to a further aspect, provided is a wind turbine tower comprising at least one wind turbine component according to at least one of the design variants described above.

According to a further aspect, provided is a rotor blade of a wind turbine, comprising at least one wind turbine component according to at least one of the design variants described above.

According to a further aspect, provided is a wind turbine, comprising a wind turbine tower according to the aspect described above and/or a rotor blade according to the aspect described above.

According to a further aspect, provided is a method for producing a wind turbine component for a wind turbine, in particular for a wind turbine tower and/or a rotor blade, comprising arranging a corrugated structural element on a first inner surface or on a first outer surface, which is arranged opposite the latter, of a first wall element, and connecting the first wall element to the structural element.

Furthermore, it is preferred that the method comprises the step of arranging a second wall element in a cavity formed by the first wall element, arranging the structural element between the first wall element and the second wall element, connecting the first wall element to the structural element and/or connecting the second wall element to the structural element, in particular by means of an adhesive material.

The method and its possible developments have features or method steps which make them particularly suitable for being used for a wind turbine component according to the invention and its developments. For further advantages, design variants and design details of these further aspects and their possible developments, reference is also made to the description given above with regard to the corresponding features and developments of the wind turbine component.

BRIEF DESCRIPTION OF THE SEVERAL VIEWS OF THE DRAWINGS

Preferred exemplary embodiments will be discussed by way of example on the basis of the appended figures. In the figures.

In the figures, identical or substantially functionally identical or similar elements are denoted by the same reference signs.

DETAILED DESCRIPTION

Figure 1:
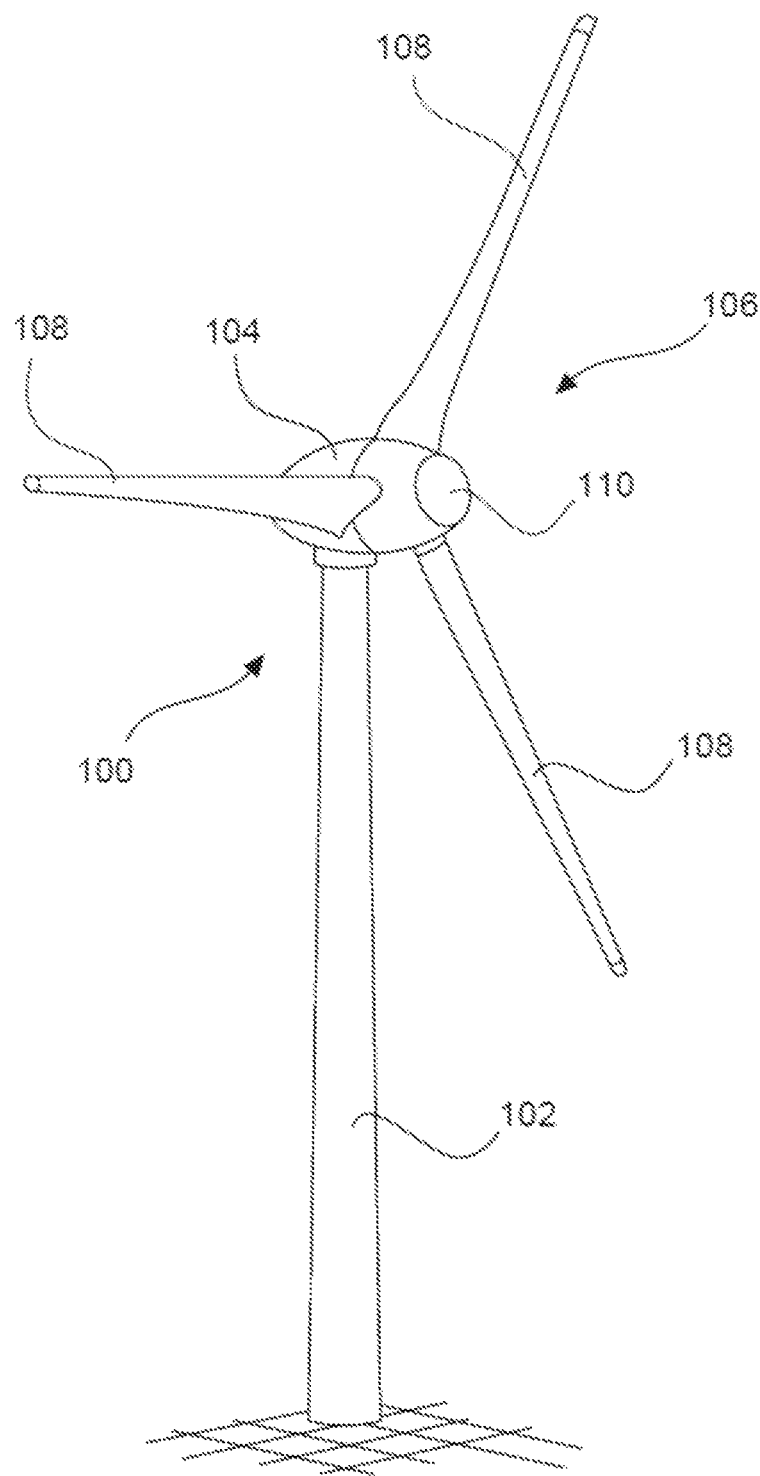
FIG. 1 shows a schematic three-dimensional view of an exemplary embodiment of a wind turbine.

FIG. 1 shows a schematic three-dimensional view of an exemplary embodiment of a wind turbine 100. FIG. 1 shows in particular a wind turbine 100 with a tower 102 and with a nacelle 104. A rotor 106 having three rotor blades 108 and having a spinner 110 is arranged on the nacelle 104. The rotor 106 is set in rotation by the wind during operation and thereby drives a generator in the nacelle 104. The tower 102 has at least one tower section 200, which is explained in more detail below. The wind turbine 100 comprises at least one wind turbine component. Preferably, one, two, several or all sections of the tower 102 are provided in an analogous manner to the wind turbine component configured in the form of a tower section 200 described below.

Figure 2:
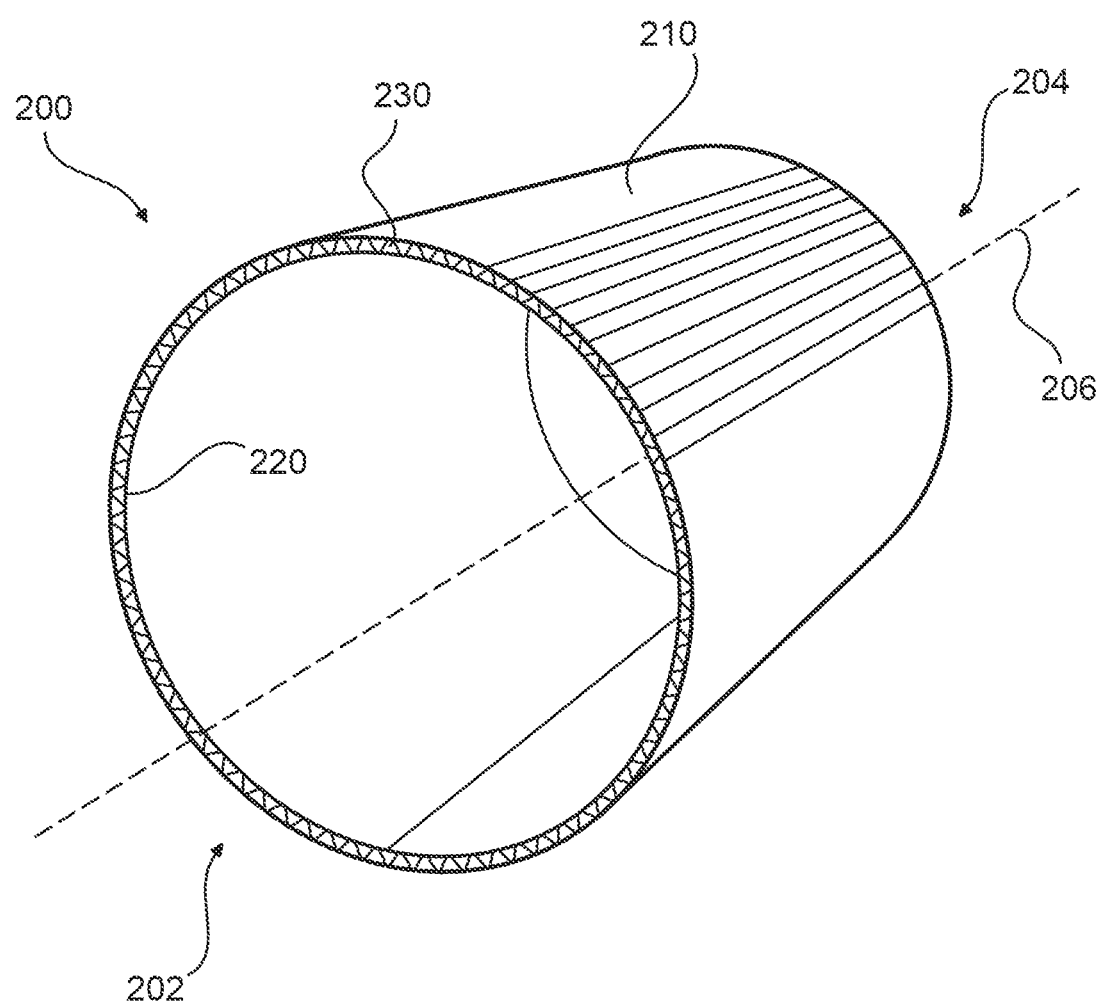
FIG. 2 shows a schematic three-dimensional view of an exemplary embodiment of a wind turbine component.

FIG. 2 shows a schematic three-dimensional view of an exemplary embodiment of a wind turbine component configured in the form of a tower section. The tower section 200 is of cylindrical configuration. The tower section 200 extends with a tower section length from an upper horizontal abutment side 202 to a lower horizontal abutment side 204. On these abutment sides 202, 204, the tower section 200 in the intended installation state in a wind turbine tower abuts against further tower sections.

The tower section 200 has a first wall element configured in the form of an outer wall element 210 and a second wall element configured in the form of an inner wall element 220. The outer wall element 210 and the inner wall element 220 have an axis of rotation 206. The outer wall element 210 and the inner wall element 220 are configured to be rotationally symmetrical about the axis of rotation 206. The outer wall element 210 and the inner wall element 220 have a ring-shaped cross section orthogonally with respect to the axis of rotation 206. The inner diameter of the outer wall element 210 is larger than the outer diameter of the inner wall element 220. As a result, the inner wall element 220 can be arranged within the outer wall element 210. The outer wall element 210 and the inner wall element 220 are arranged coaxially with respect to one another. The tower section 200 extends with a tower section length between the upper horizontal abutment side 202 and the lower horizontal abutment side 204. In this direction, the outer wall element 210 and the inner wall element 220 have the same length.

The outer diameter of the inner wall element 220 is smaller than the inner diameter of the outer wall element 210. This creates a cavity, or an intermediate space, between the outer wall element 210 and the inner wall element 220. A structural element 230 is arranged in the aforementioned cavity between the outer wall element and the inner wall element. The structural element 230 is corrugated. The structural element 230 extends with a horizontal structural element length between the upper horizontal abutment side 202 and the lower horizontal abutment side 204. The structural element length preferably corresponds to the tower section length.

The tower section length of the tower section 200 may for example be 24 meters. The outer diameter of the tower section 200 may be 4.3 meters. The spacing between the inner circumferential surface of the outer wall element 210 and the outer circumferential surface of the inner wall element 220 is preferably 30 mm. The amplitude of the structural element 230 is consequently also preferably 30 mm, such that a first part of the apexes can be connected to the outer wall element 210 and a second part of the apexes, said second part being arranged opposite to the apexes of the first part, can be connected to the inner wall element 220.

Figure 3:
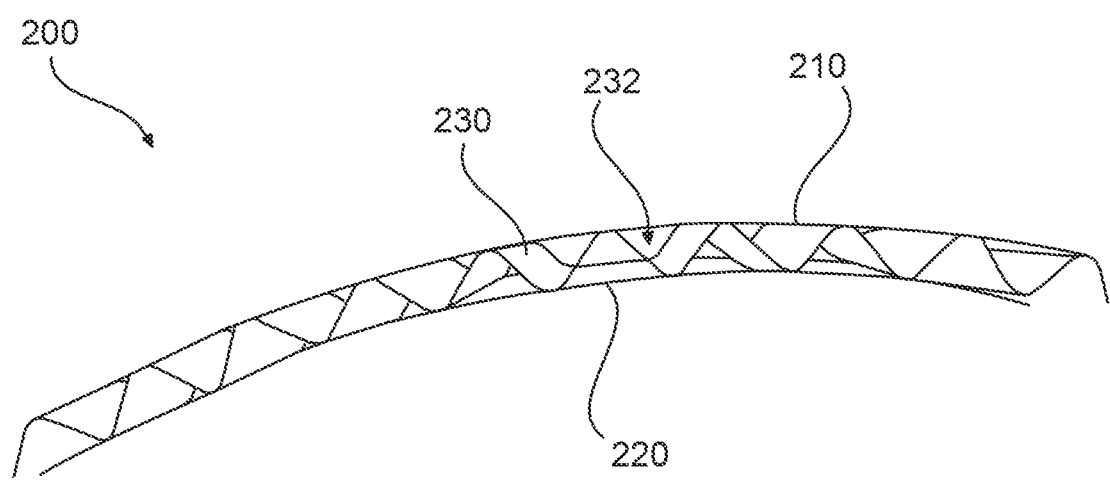
FIG. 3 shows a detail view of the wind turbine component shown in FIG. 2.

FIG. 3 shows a detail view of the tower section 200 shown in FIG. 2. The detail view shown here shows the configuration of the structural element 230 between the outer wall element 210 and the inner wall element 220. The structural element 230 extends in a corrugated manner orthogonally with respect to a radial direction of the tower section 200 and orthogonally with respect to the axis of rotation 206. These corrugations are of sinusoidal configuration here. The corrugated geometry of the structural element 230 produces a multiplicity of cavities 232 between the outer wall element 210 and the inner wall element 220.

It is preferred that at least one of the cavities 232 at least partially comprises a filling material, in particular steel and/or plastics material, for example fiber-reinforced plastic, wherein the filling material is configured such that a threaded rod for connection of two tower sections can be screwed in. In addition, it is preferred that a threaded sleeve is arranged in at least one of the cavities 232, wherein the threaded sleeve is preferably glued in. Here, the main direction of extent of the connecting sections runs substantially orthogonally with respect to the image plane. Here, the main directions of extent of the connecting sections are oriented in such a way that they are oriented parallel to the tower section length. This means that the main directions of extent of the connecting sections are oriented substantially parallel to the axis of rotation 206.

The structural element 230 is connected to the outer wall element 210 and to the inner wall element 220. The structural element 230 abuts against the outer wall element 210 by way of its connecting sections on an outer side of the structural element 230. The structural element 230 abuts against the inner wall element 220 by way of connecting sections on an inner side of the structural element 230. The structural element 230 is connected to the outer wall element 210 by means of the connecting sections. The structural element 230 is also connected to the inner wall element 220 by way of its connecting sections. The structural element 230 may be connected to the inner wall element 220 and the outer wall element 210 by means of an adhesive material. In particular, it is preferred that this connection is formed without welded joints.

Figure 4:
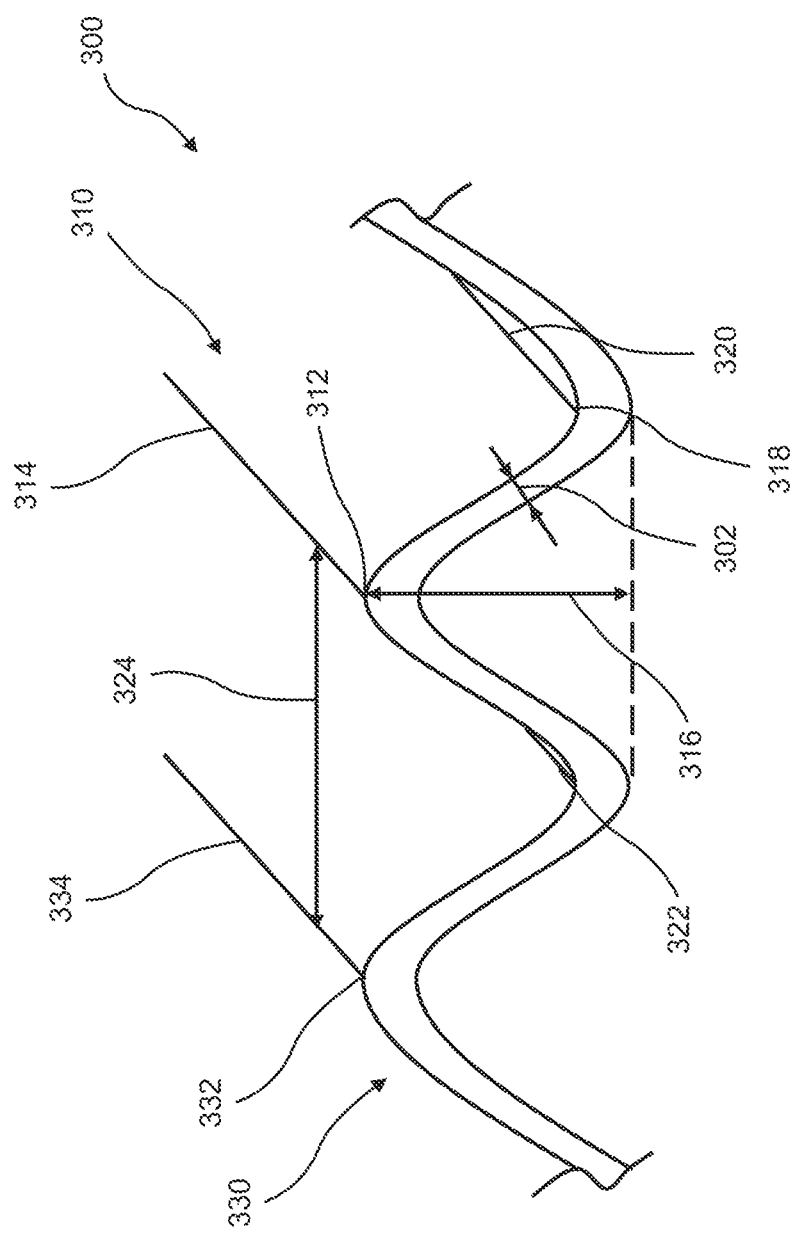
FIG. 4 shows a schematic three-dimensional view of an exemplary embodiment of a corrugated structural element.

FIG. 4 shows a schematic three-dimensional view of an exemplary embodiment of a corrugated structural element 300. The structural element 300 has a first corrugation 310 and a second corrugation 330. The first corrugation 310 extends from a first depression line 320 toward a second depression line 322. The first depression line 320 issues from an edge of the structural element 300 at a depression point 318. The structural element 300 has a first apex 312 between the first depression line 320 and the second depression line 322. Starting from the first apex 312, a first connecting section 314 runs orthogonally with respect to the sinusoidal profile of the structural element 300. The first corrugation 310 extends orthogonally with respect to the first connecting section 314 in the direction of an amplitude 316. The first connecting section 314 has a planar contact surface with which said first connecting section can be arranged on a first or second wall element.

Analogously to this, the second corrugation 330 has a second apex 332, from which the second connecting section 334 issues. The second connecting section 334 also has a planar contact surface with which said second connecting section can be arranged on a first or second wall element. The main direction of extent of the first connecting section 314 is oriented parallel to the main direction of extent of the second connecting section 334. The structural element 300 has a distance 324 between the connecting sections 314, 334. The distance 324 is the measure of the smallest spacing between the first connecting section 314 and the second connecting section 334. In addition, the structural element 300 has a structural element thickness 302. The structural element thickness 302 corresponds substantially to the material thickness from which the structural element 300 was produced.

Figure 5:
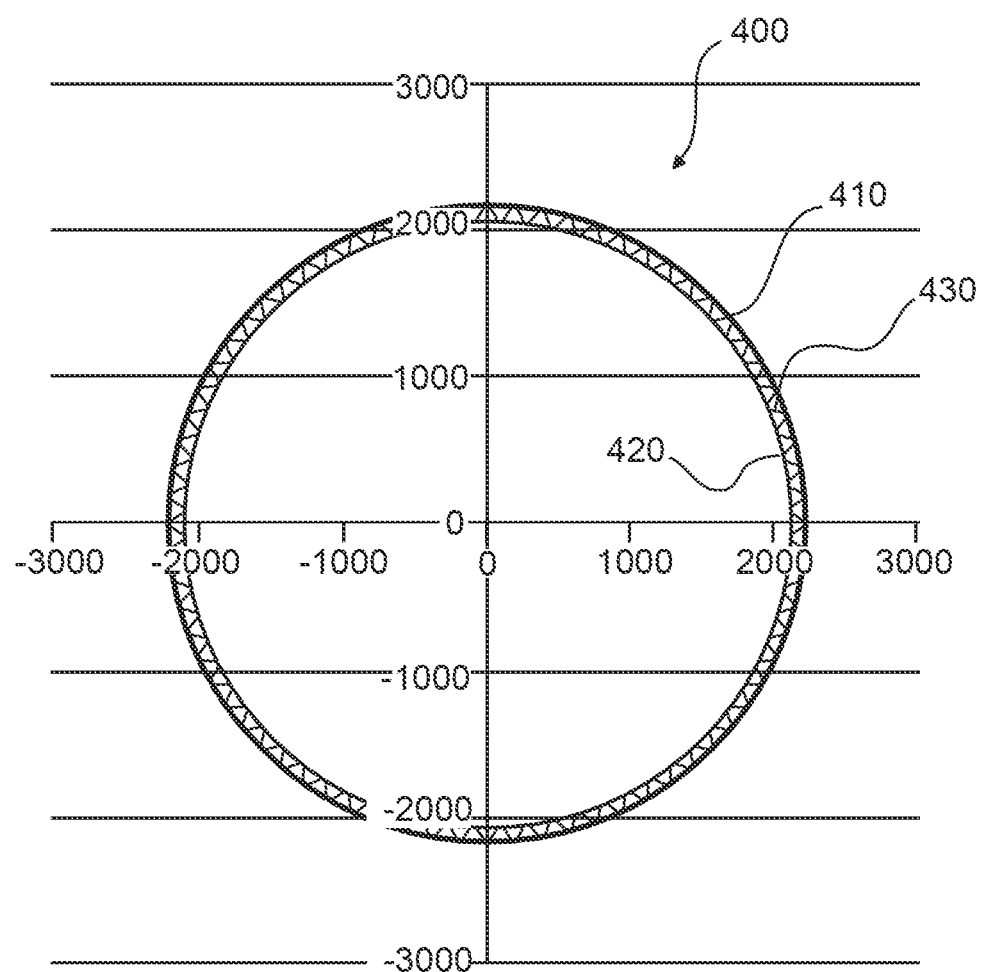
FIG. 5 shows a schematic two-dimensional cross-sectional view of a wind turbine component.

FIG. 5 shows a schematic two-dimensional cross-sectional view of a wind turbine component configured in the form of a tower section 400. The inner wall element 420 has an outer diameter of almost 4000 mm. The outer wall element 410 has an inner diameter of almost 4300 mm. The structural element 430 is arranged between the outer wall element 410 and the inner wall element 420 and has a sinusoidal profile in the ring direction.

Figure 6:
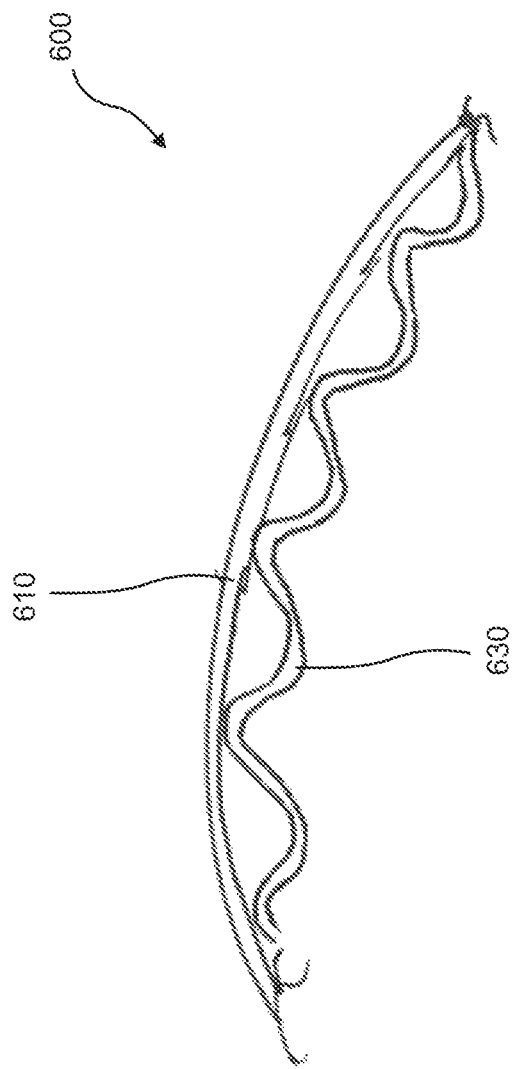
FIG. 6 shows a further schematic two-dimensional cross-sectional view of a wind turbine component.

FIG. 6 shows a further schematic two-dimensional cross-sectional view of a wind turbine component. The wind turbine component 600 comprises a single wall element 610 and a structural element 630 connected thereto. In contrast to the exemplary embodiments shown above, the wind turbine component 600 comprises only one wall element and no second wall element. The wall element 610 is configured in the form of an outer wall element, such that the structural element is arranged on an inner surface, in particular an inner circumferential surface, of the wall element 610.

Figure 7:
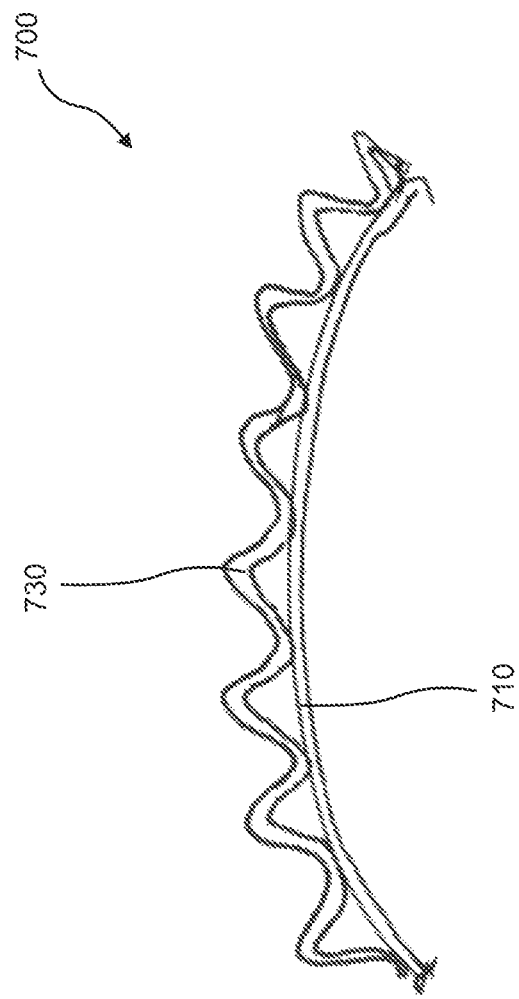
FIG. 7 shows a further schematic two-dimensional cross-sectional view of a wind turbine component.

FIG. 7 shows a further schematic two-dimensional cross-sectional view of a wind turbine component. The wind turbine component 700 comprises a single wall element 710 and a structural element 730 connected thereto. The wind turbine component 700 shown here differs from the exemplary embodiments described above in that it comprises only the wall element 710 configured in the form of an inner wall element and does not have an outer wall element. The structural element 730 is arranged on an inner circumferential surface of the wall element 710.

Figure 8:
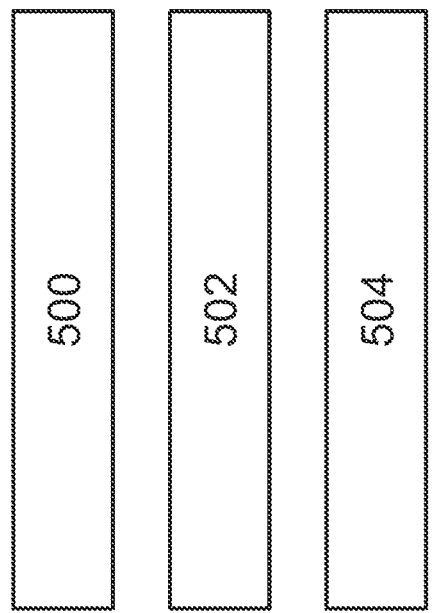
FIG. 8 shows a schematic method for producing a wind turbine component for a wind turbine tower.

FIG. 8 shows a schematic method for producing a tower section for a wind turbine tower. In step 500, a rotationally symmetrical inner wall element 220, 420 is arranged in a cavity formed by a rotationally symmetrical outer wall element 210, 410.

In step 502, a corrugated structural element 230, 300, 430 is arranged between the outer wall element 210, 410 and the inner wall element 220, 420.

In step 504, the outer wall element 210, 410 is connected to the structural element 230, 300, 430, preferably by means of an adhesive material. In addition or as an alternative, in step 504, the inner wall element 220, 420 may be connected to the structural element 230, 300, 430, preferably by means of an adhesive material.

The arrangement of a structural element 230, 300, 430 between an outer wall element 210, 410 and an inner wall element 220, 420 makes it possible to increase the stiffness, in particular the buckling stiffness and the flexural stiffness, of a wind turbine tower. In particular, this effect can be achieved by orienting the main directions of extent of the connecting sections of the corrugated structural element 230, 300, 430 substantially parallel to a tower section longitudinal direction and/or an axis of rotation of the tower section 200, 400 of the outer wall element 210, 410 and/or of the inner wall element 220, 420. As a result of this improved stiffness of the tower section 200, 400, the wind turbine towers 102 can be provided with a smaller outer diameter. On the one hand, this smaller outer diameter enables material to be saved and, on the other hand, a smaller outer diameter enables better logistics, for example when the tower section 200, 400 is being transported to a construction site of a wind turbine 100. In addition, the proportion of vertically segmented tower sections can be reduced or this segmentation can be avoided, since fewer tower sections exceed the maximum transportable dimension of 4.3 m.

REFERENCE SIGNS

100 Wind turbine
102 Tower
104 Nacelle
106 Rotor
108 Rotor blades
110 Spinner
200, 400, 600, 700 Wind turbine component
202 Upper horizontal abutment side
204 Lower horizontal abutment side
206 Axis of rotation
210, 410, 610 First wall element
220, 420, 710 Second wall element
230, 300, 430, 630, 730 Structural element
232 Cavity
302 Structural element thickness
310 First corrugation
312 First apex
314 First connecting section
316 Amplitude
318 Depression point
320 First depression line
322 Second depression line
324 Distance
330 Second corrugation
332 Second apex
334 Second connecting section

The invention claimed is:

1. A wind turbine component for a wind turbine tower, the wind turbine component comprising:
   a first wall element with a first inner surface and a first outer surface arranged opposite the first inner surface,
   a structural element having a plurality of corrugations,
   wherein the structural element is arranged on the first inner surface or on the first outer surface,
   wherein the first wall element is connected to the structural element,
   a second wall element with a second inner surface and a second outer surface arranged opposite the second inner surface,
   wherein the structural element is arranged between the first wall element and the second wall element, and the structural element is connected to the first wall element and the second wall element,
   wherein the first wall element and the second wall element comprise at least one material from a group comprising steel, aluminum, and titanium,
   wherein the first wall element and the second wall element have a ring-shaped cross section orthogonal with respect to an axis of rotation,
   wherein the plurality of corrugations of the structural element has a spacing between adjacent connecting sections that is less than 500 mm,
   wherein the first wall element has a wall thickness and the structural element has a structural element thickness, and
   wherein a ratio of the structural element thickness to the wall thickness is greater than 0.1.

2. The wind turbine component as claimed in claim 1, wherein the first wall element is connected to the structural element by an adhesive material.

3. The wind turbine component as claimed in claim 2, wherein the adhesive material is selected from a group consisting of:
   hot-melt adhesive;
   polyurethane adhesive;
   epoxy resin adhesive; and
   cyanoacrylate.

4. The wind turbine component as claimed in claim 1, wherein:
   at least one corrugation of the plurality of corrugations comprises a connecting section, and
   the structural element is connected to the first wall element by the connecting section.

5. The wind turbine component as claimed in claim 1, wherein the plurality of corrugation is more than 20 corrugations, and wherein each corrugation has an amplitude of more than 10 mm.

6. The wind turbine component as claimed in claim 1, wherein:
   the first wall element is at least partially curved, oval-shaped, polygonal-shaped, or has a rotationally symmetrical configuration.

7. The wind turbine component as claimed in claim 1, wherein:
   the structural element is at least partially curved, cylindrical-shaped, conical-shaped, or has a rotationally symmetrical configuration.

8. The wind turbine component as claimed in claim 1, wherein the structural element comprises at least one material from a group comprising steel, aluminum, titanium, plastic, fiber-reinforced plastic, and glass-fiber-reinforced plastic.

9. The wind turbine component as claimed in claim 1, wherein:
   the plurality of corrugations includes a first corrugation and a second corrugation,
   the first corrugation has a first connecting section facing the first wall element, and the second corrugation has a second connecting section facing the second wall element, and
   the first wall element is connected to the structural element by the first connecting section and the second wall element is connected to the structural element by the second connecting section.

10. The wind turbine component as claimed in claim 9, wherein:
    the structural element is arranged in such a way that the first and second connecting sections have main directions of extent oriented substantially parallel to the wall element length.

11. The wind turbine component as claimed in claim 1, wherein:
    the first wall element extends with a wall element length between a first abutment side and a second abutment side and the structural element extends with a structural element length between the first abutment side and the second abutment side, and
    the structural element length corresponds substantially to the wall element length.

12. The wind turbine component as claimed in claim 11, wherein the structural element forms a plurality of cavities adjoining at least one of the first abutment side or the second abutment side.

13. The wind turbine component as claimed in claim 1, wherein the component is a tower section or a rotor blade.

14. A wind turbine tower, comprising at least one wind turbine component as claimed in claim 1.

15. A wind turbine, comprising the wind turbine tower as claimed in claim 14.

16. The wind turbine component as claimed in claim 1, wherein the connection between the first wall element and the structural element is formed without welded joints.

17. A method for producing a wind turbine component for a wind turbine, comprising:
- arranging a corrugated structural element on a first inner surface or on a first outer surface of a first wall element, the second outer surface being arranged opposite the first inner surface, and
- connecting the first wall element to the corrugated structural element,
- arranging a second wall element in a cavity formed by the first wall element such that the corrugated structural element is located between the first wall element and the second wall element, and
- connecting the first wall element to the structural element and connecting the second wall element to the structural element by an adhesive material,
- wherein the first wall element and the second wall element comprise at least one material from a group comprising steel, aluminum, and titanium,
- wherein the first wall element and the second wall element have a ring-shaped cross section orthogonal with respect to an axis of rotation of the wind turbine when the wind turbine component is coupled to the wind turbine, and
- wherein a plurality of corrugations of the structural element has a spacing between adjacent connecting sections that is less than 500 mm,
- wherein the first wall element has a wall thickness and the structural element has a structural element thickness, and
- wherein a ratio of the structural element thickness to the wall thickness is greater than 0.1.

* * * * *